(12) United States Patent
Zhao et al.

(10) Patent No.: US 11,408,052 B2
(45) Date of Patent: Aug. 9, 2022

(54) MULTI-STAGE REACTION AND SEPARATION SYSTEMS OF A CO2-BASED HYDROMETALLURGICAL PROCESS

(71) Applicant: Greenore Cleantech (Shanghai) Co., Ltd, Shanghai (CN)

(72) Inventors: Huangjing Zhao, Shanghai (CN); Xiaozhou Zhou, Shanghai (CN)

(73) Assignee: Greenore Cleantech (Shanghai) Co., Ltd, Shanghai (CN)

( * ) Notice: Subject to any disclaimer, the term of this patent is extended or adjusted under 35 U.S.C. 154(b) by 112 days.

(21) Appl. No.: 16/985,648

(22) Filed: Aug. 5, 2020

(65) Prior Publication Data
US 2021/0381078 A1 Dec. 9, 2021

(30) Foreign Application Priority Data

Jun. 5, 2020 (CN) .......................... 202010507901.5

(51) Int. Cl.
| | |
|---|---|
| *C22B 3/02* | (2006.01) |
| *B01D 21/26* | (2006.01) |
| *B01D 25/12* | (2006.01) |
| *C22B 1/00* | (2006.01) |
| *C22B 3/22* | (2006.01) |
| *B01D 36/04* | (2006.01) |
| *B09B 3/00* | (2022.01) |
| *C22B 26/22* | (2006.01) |

(52) U.S. Cl.
CPC .............. *C22B 3/02* (2013.01); *B01D 21/262* (2013.01); *B01D 25/12* (2013.01); *B01D 36/045* (2013.01); *B09B 3/00* (2013.01); *C22B 1/005* (2013.01); *C22B 3/22* (2013.01); *C22B 26/22* (2013.01)

(58) Field of Classification Search
None
See application file for complete search history.

(56) References Cited

U.S. PATENT DOCUMENTS

| | | | | |
|---|---|---|---|---|
| 2020/0239978 | A1* | 7/2020 | Papouchado | ........... C01F 11/02 |
| 2021/0380406 | A1* | 12/2021 | Zhou | ........................ B01J 8/24 |
| 2021/0381078 | A1* | 12/2021 | Zhao | ................... B01D 21/262 |

FOREIGN PATENT DOCUMENTS

CN 106999947 B 9/2019

* cited by examiner

*Primary Examiner* — Scott R Kastler
(74) *Attorney, Agent, or Firm* — Bayramoglu Law Offices LLC

(57) ABSTRACT

The present invention is a $CO_2$ based hydrometallurgical multistage reaction and separation system comprising: a pre-washing device configured to fully mix the feedstock, such as industrial solid waste, mineral and mine tailings with auxiliary reagents and water at specific ratio, a reactor configured to treat the washed slurry with $CO_2$ bubbling and discharge the treated slurry to the next stage, multistage separators configured to separate solid particles from treated slurry and recycle the unreacted solids back into the pre-washing device, a by-product preparation device configured to generate calcium and magnesium based products from filtrate containing target elements, a water recirculating device configured to recycle the remaining liquor back to the system. The present invention ensures the whole system is able to continuously and consistently react at maximum capacity through continuous slurry feeding and $CO_2$ bubbling into the reactors which also enables multistage circulating reaction.

20 Claims, 1 Drawing Sheet

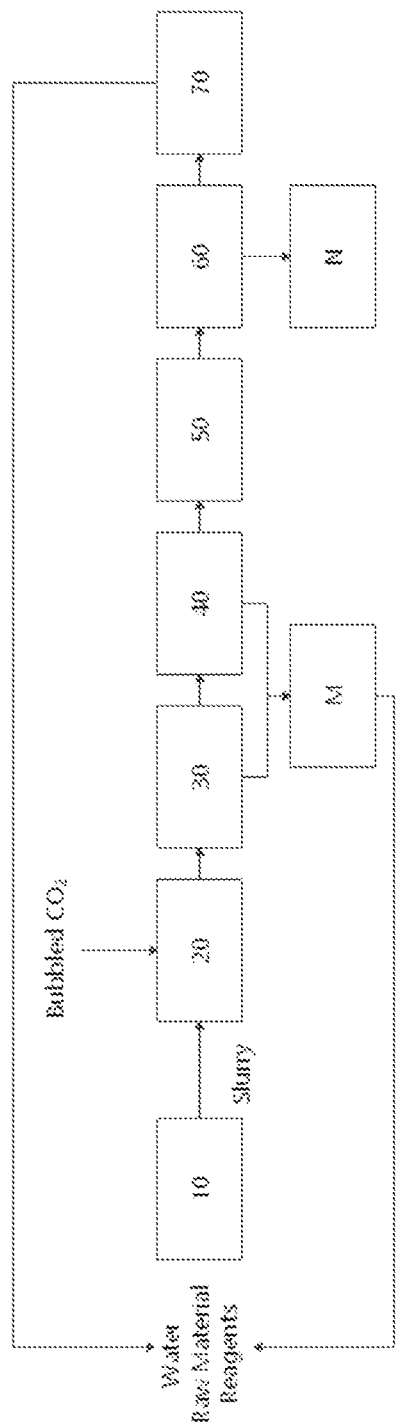

MULTI-STAGE REACTION AND SEPARATION SYSTEMS OF A CO2-BASED HYDROMETALLURGICAL PROCESS

CROSS REFERENCES TO THE RELATED APPLICATIONS

This application is based upon and claims priority to Chinese Patent Application No. 202010507901.5, filed on Jun. 5, 2020, the entire contents of which are incorporated herein by reference.

TECHNICAL FIELD

The present invention relates to hydrometallurgy, carbon capture, utilization and sequestration (CCUS), and solid waste valorization, specifically referring to a $CO_2$ based hydrometallurgical multistage reaction and separation system.

BACKGROUND

Underutilization of waste materials, such as industrial solid waste, mineral and mine tailings, generated by steel mills, power plants, aluminum smelters and mines, can lead to contamination and pollution of soil, water and air and other environmental concerns.

The Patent No. CN106999947B discloses methods and systems for recovering products from iron and steel slag comprising a first source of iron or steel slag, a milling module configured to mill the first source of iron or steel slag to a predetermined size, a magnetically assisted fluidized bed configured to produce a non-magnetic-material-enriched portion from the iron or steel slag, a slag treatment module comprising a fluid stream including at least one of water, saline, acids, and flue gas, configured to contact the non-magnetic-material-enriched portion with the fluid stream, a first precipitation module in fluid communication with the slag treatment module, an acid leaching module comprising an acid and a chelating agent, a separator producing a slag residue stream and at least one leachate stream comprising metal oxides, metal carbonates, and rare-earth elements, a second precipitation module configured to produce at least one of a metal carbonate product, a metal oxide product, and a rare-earth element product, and a conversion reactor in fluid communication with the acid leaching module and configured to produce water glass from the slag residue stream. The methods and systems disclosed in the patent for recovering products from iron and steel slag are performed in three-phased batch reactors which wastes time on the unnecessary repetitive steps of feeding and discharging slurry and affects the maximum treatment capacity per unit time of the whole system.

Therefore, in order to overcome the current technical difficulties and limitations, it is urgent to develop a $CO_2$ based hydrometallurgical multistage reaction and separation systems which ensures the whole system can continuously and stably react at maximum treatment capacity during the processes of feeding, reacting, discharging and multistage separating.

SUMMARY

In terms of overcoming the technical difficulties and limitations addressed above, the present invention proposes an improved alternative solution comprised of a $CO_2$ based hydrometallurgical multistage reaction and separation system.

To solve the technical issues addressed above, the following modes are proposed below: The present invention is a $CO_2$ based hydrometallurgical multistage reaction and separation system comprising:

Pre-washing device: the feedstock, such as industrial solid waste, mineral and mine tailings, is continuously added and fully mixed with auxiliary reagents and water at specific ratio into the pre-washing device.

Reactor: the washed slurry from pre-washing device is continuously transferred into the reactor by using pump unit. $CO_2$ is bubbled into the reactor under specific pressure in order to be fully mixed and reacted with the washed slurry. The $CO_2$ treated slurry is continuously discharged from the reactor.

Multistage separators: the $CO_2$ treated slurry is filtered by multistage separators where the unreacted solids are recycled as feedstock into the next stage of reaction and separation.

By-product preparation device: the filtrate from the multistage separators containing target elements of calcium and magnesium is continuously transferred into a by-product preparation device to form calcium and magnesium based products, wherein the products are not limited by calcium and magnesium depending on the feedstock. A water recirculating device is used to recycle the remaining liquor back to the system after by-product is collected.

Furthermore, the system addressed above also comprises a purifier which is arranged after multistage separators. Besides the target elements of calcium and magnesium, filtrate from the multistage separators may also contain other impurities such as iron, silicon, aluminum and etc. The filtrate is continuously transferred into a purifier after processing through the multistage separators. Precipitation is performed to remove impurities from the filtrate by physically and/or chemically changing the pH value of the solution.

Furthermore, in the system described above, the added feedstock, such as industrial solid waste, mineral and mine tailings, added into the pre-washing device should be less than 10% by weight of the slurry and the added auxiliary reagents should be less than 5% by weight of the slurry.

Furthermore, in the system described above, the added $CO_2$ is continuously bubbled into the reactor under pressure less than 100 bars and fully mixed and reacted with slurry while the reaction temperature is controlled under 90° C.

Furthermore, in the system described above, the multistage separators comprise a primary coarse separation module and a secondary fine separation module, where the size of particles separated by the primary coarse separator module is larger than 5-10 μm and the size of particles separated by the secondary fine separator module is smaller than 1-5 μm. In particular, the combined reaction time of the separation modules in total is less than 1 hour.

Furthermore, in the system described above, the multistage separators are set up as either of the combination of a sedimentation centrifuge and disk type centrifuge combination, the combination of two filter presses, or the combination of a sedimentation centrifuge and a filter press.

Furthermore, in the system described above, the unreacted solids are recycled as feedstock into the next stage of reaction and separation. The frequency of recycling the unreacted solids is less than 5.

Furthermore, in the system described above, impurities are precipitated from the filtrate by physically and/or chemically changing the pH value of the solution through either continuously adding alkaline reagents, acid reagents, coagulant and/or flocculant which is less than 1% by weight of solution, injecting air/steam or heating the solution.

Furthermore, in the system described above, multistage separators also comprise a third stage solid-liquid separation module which is arranged after the purifier. The third stage solid-liquid separation module is able to continuously separate the precipitated particles from the filtrate containing target elements of calcium and magnesium by using either dish-stack centrifuge, filter press or filtration.

Furthermore, in the system described above, if the remaining filtrate after the third stage solid-liquid separation module is enriched with iron after passing through the third stage solid-liquid separation module, iron is collected as ferric and/or ferrous hydroxides precipitation for recycling and reusing.

Furthermore, in the system described above, the filtrate containing target elements of calcium and magnesium is transferred into the by-product preparation device to generate calcium and magnesium products which are in the formation of calcium magnesium carbonates, calcium carbonates and magnesium carbonates, calcium hydroxides and magnesium hydroxides, calcium and magnesium sulfates or calcium and magnesium nitrates.

Furthermore, in the system described above, remaining liquor is recirculated back to the system after the by-product is collected and the recycle frequency of water is larger than 2.

Furthermore, in the system described above, the industrial solid waste comprises steel slag, iron slag, fly ash, bottom ash, red mud, waste concrete/cement, tailings and etc.

Furthermore, in the system described above, the feedstock comprises various types of calcium and magnesium bearing minerals.

Furthermore, in the system described above, the auxiliary reagents comprise at least one of acid, salts or the combination containing organic anions. The anions or acids consist of: oxalate, citrate, picolinate, gluconate, glutamate, formic acid, acetic acid, propionate, valerate, lactate, succinate, phosphate, pyrophosphate, ascorbic acid, and phthalic acid.

Furthermore, in the system described above, the bubbled $CO_2$ is from the flue gas generated by power plants, blast furnaces, basic oxygen furnaces/converters, refining furnaces, lime kilns, coal-to-chemicals manufacturing plants or petrochemical manufacturing plants, which the content of carbon dioxide varies between 15% and 98%.

Compared with current technics, the present invention has the technical advantages as shown below:

The present invention ensures the whole system is able to continuously and consistently react at maximum capacity through continuous slurry feeding and $CO_2$ bubbling into the reactors which also enables multistage circulating reaction. Moreover, compared to the current three-phased batch reactions, $CO_2$ lost and unnecessary time loss derived from repetitive feeding and discharging can be minimized which is the current technical limitation led to the underperformance of the whole system.

The present invention provides a green leaching process of target elements by adjusting the pressure of $CO_2$ bubbling process, ratio of auxiliary reagents and reaction temperature by eliminating the usage of strong acid or highly corrosive acid such as nitric acid, hydrochloric acid, sulfuric acid and hydrofluoric acid.

The present invention ensures the whole system is able to continuously and consistently separate solid from slurry at maximum capacity through the optimized multistage separation processes for a wide distributed particle sizes which shortens the total separation time and increases the likelihood of the separation system operate continuously and consistently.

The present invention facilitates large-scale industrialization based on the integration and optimization of continuous reaction and separation system.

The present invention is able to recycle and valorize solid wastes and $CO_2$ emission while minimizing consumption of extra material and energy to achieve the goal of a near zero secondary-pollution and near zero-emission. Moreover, the present invention is also an environmental-friendly system which reduces and utilizes carbon emission with no additional carbon footprint.

BRIEF DESCRIPTION OF THE DRAWINGS

In accordance with the following detailed description of a non-restrictive embodiment's FIGURE shown below, the improvement of the present invention will be explicitly illustrated in terms of features, purposes and advantages.

FIG. 1: Process Flowsheet of The Present Invention as A $CO_2$ Based Hydrometallurgical Multistage Reaction and Separation System

DETAILED DESCRIPTION OF THE EMBODIMENTS

To further explicitly demonstrate the purpose, characteristics and performance of this application, a further explanation will be combined with attached FIGURE in order to fully illustrated the detailed concept, concrete arrangement and technical purposes of the system.

With respect to one of the embodiments for the $CO_2$ based hydrometallurgical multistage reaction and separation system shown in FIG. 1, the flowsheet is described as follows:

The feedstock, such as industrial solid waste, mineral and mine tailings, is continuously added and fully mixed with auxiliary reagents and water at specific ratio into the pre-washing device (10).

The washed slurry from pre-washing device (10) is continuously transferred to reactor (20) by using pump unit. $CO_2$ is bubbled into reactor (20) under specific pressure in order to fully mixed and reacted with the washed slurry. The $CO_2$ treated slurry is then continuously discharged from reactor (20).

The $CO_2$ treated slurry discharged from reactor (20) is filtered by multistage separators where unreacted solid particles (M) are recycled as feedstock into the next stage of reaction and separation.

The filtrate from the multistage separator containing target elements of calcium and magnesium is continuously transferred into by-product preparation device (70) to form calcium and magnesium based product.

The remaining liquor from by-product preparation device (70) is recycled into a water recirculating device back to the system after by-product is collected.

In this embodiment, the whole system is able to continuously and consistently react at maximum capacity through continuous slurry feeding and $CO_2$ bubbling into the reactors which also enables multistage circulating reaction. Moreover, compared to the current three-phased batch reactions, $CO_2$ loss and unnecessary time loss derived from repetitive feeding and discharging can be minimized.

This embodiment also comprises purifier (50) which is arranged after multistage separators. Besides the target elements of calcium and magnesium, filtrate from the multistage separators may also contain other impurities such as iron, silicon, aluminum and etc. The filtrate is continuously transferred into purifier (50) after processing through the multistage separators. Precipitation is performed to remove impurities from the filtrate by physically and/or chemically changing the pH value of the solution.

Furthermore, the added feedstock, such as industrial solid waste, mineral and mine tailings, added into the pre-washing device should be less than 10% by weight of the slurry and the added auxiliary reagents should be less than 5% by weight of the slurry. In practical application, proportion of auxiliary reagents can be adjusted depending on actual component of the feedstock.

Thereinto, the added industrial solid waste comprises steel slag, iron slag, fly ash, bottom ash, red mud, waste concrete/cement, tailings and etc.

Thereinto, the added mineral and mine tailings comprise various types of calcium and magnesium bearing minerals.

Thereinto, the added auxiliary reagents comprise at least one of acid, salts or the combination containing organic anions. The anions or acids consist of, but are not limited to, oxalate, citrate, picolinate, gluconate, glutamate, formic acid, acetic acid, propionate, valerate, lactate, succinate, phosphate, pyrophosphate, ascorbic acid, phthalic acid.

The added water is fresh water and the remaining liquor recycled by the water recirculating device.

Thereinto, the added $CO_2$ is continuously bubbled into reactor (20) under pressure less than 100 bars and fully mixed and reacted with washed slurry where the reaction temperature is controlled under 90° C. This embodiment provides a green leaching process of target elements by adjusting the pressure of $CO_2$ bubbling process, ratio of auxiliary reagents and reaction temperature by eliminating the usage of strong acid or highly corrosive acid such as nitric acid, hydrochloric acid, sulfuric acid and hydrofluoric acid.

In this embodiment, the bubbled $CO_2$ is from the flue gas generated by power plants, blast furnaces, basic oxygen furnaces/converters, refining furnaces, lime kilns, coal-to-chemicals manufacturing plants or petrochemical manufacturing plants, which the content of carbon dioxide varies between 15% and 98%.

Furthermore, the multistage separators comprise a primary coarse separation module (30) and a secondary fine separation module (40), where the size of particles separated by the primary coarse separator module (30) is larger than 5-10 μm and the size of particles separated by the secondary fine separator module (40) is smaller than 1-5 μm. In particular, the combined reaction time of each separation module in total is less than 1 hour. This embodiment ensures the whole system is able to continuously and consistently separate solids from slurry at maximum capacity through the optimized multistage separation processes for a wide distributed particle sizes which shortens the total separation time and increases the likelihood of the separation system to operate continuously and consistently. Technical issues of single-stage separation caused by the requirement of removing solid particles of all sized all at once is minimized. Moreover, sedimentation centrifuge is proved to be inefficient in single-stage separation for particle sizes under 5 μm which affects the maximum treatment capacity per unit time of the whole system and leads to a high energy consumption. In the case that a filter press is used in single-stage separation, filter is frequently clogged with various sizes of solid particles which also affects the maximum treatment capacity per unit time of the whole system and increases operating cost since frequent filter replacement is required.

Thereinto, the multistage separators can be applied comprising of either the combination of a sedimentation centrifuge and a disk-stack centrifuge, the combination of two filter press, or the combination of a sedimentation centrifuge and a filter press.

The $CO_2$ treated slurry discharged from reactor (20) is filtered by multistage separators where the unreacted solids (M) are recycled as feedstock into the next stage of reaction and separation. The frequency of recycling the unreacted solids (M) is less than 5.

Furthermore, in this embodiment, the filtrate is continuously transferred into purifier (50) after processing through the multistage separators. Besides the target elements of calcium and magnesium, filtrate from the multistage separators may also contain other impurities such as iron, silicon, aluminum and etc. Impurities are precipitated from the filtrate by physically and/or chemically changing the pH value of the solution through either continuously adding alkaline reagents, acid reagents, coagulant and/or flocculant which is less than 1% by weight of solution, injecting air/steam or heating the solution.

Furthermore, in this embodiment, multistage separators also comprise a third stage solid-liquid separation module (60) which is arranged after purifier (50). The third stage solid-liquid separation module (60) is able to continuously separate the precipitated particles from the filtrate containing target elements of calcium and magnesium by using either dish-stack centrifuge, filter press or filtration. The remaining filtrate containing target elements of calcium and magnesium is transferred into a by-product preparation device (70) described below.

Thereinto, if the remaining filtrate after the third stage solid-liquid separation module (60) is enriched with iron after passing through the third stage solid-liquid separation module, iron is collected as ferric and/or ferrous hydroxides precipitation for recycling and reusing.

The filtrate containing target elements of calcium and magnesium is transferred into by-product preparation device (70) to generate calcium and magnesium products which are in the forms of calcium magnesium carbonate, calcium carbonate and magnesium carbonate, calcium hydroxides and magnesium hydroxides, calcium and magnesium sulfates or calcium and magnesium nitrates.

Furthermore, remaining liquor is recirculated back to the system after the by-product is collected and the recycle frequency of water is larger than 2.

The present invention ensures the whole system is able to continuously and consistently react at maximum capacity through continuous slurry feeding and $CO_2$ bubbling into the reactors which also enables multistage circulating reaction. Moreover, compared to the current three-phased batch reactions, $CO_2$ loss and unnecessary time loss derived from repetitive feeding and discharging can be minimized which is the current technical limitation led to the underperformance of the whole system. The present invention also provides a green leaching process of target elements by adjusting the pressure of $CO_2$ bubbling process, ratio of auxiliary reagents and reaction temperature by eliminating the usage of strong acid or highly corrosive acid such as nitric acid, hydrochloric acid, sulfuric acid and hydrofluoric acid. The present invention ensures the whole system is able to continuously and consistently separate solids from slurry at maximum capacity through the optimized multistage separation processes for a wide distributed particle sizes which shortens the total separation time and increases the likelihood of the separation system to operate continuously and consistently. The present invention facilitates large-scale

What is claimed is:

1. A $CO_2$ based hydrometallurgical multistage reaction and separation system comprising:
   a pre-washing device, wherein feedstock, is continuously added and fully mixed with auxiliary reagents and water into the pre-washing device to produce a washed slurry, and wherein the feedstock comprises industrial solid waste or mineral and mine tailings;
   a reactor, wherein the washed slurry from the pre-washing device is continuously transferred into the reactor by a pump unit, $CO_2$ is bubbled into the reactor under a specific pressure in order to be fully mixed and reacted with the washed slurry, and a $CO_2$ treated slurry is continuously discharged from the reactor;
   multistage separators, wherein the $CO_2$ treated slurry is filtered by the multistage separators to produce a filtrate, and unreacted solids are recycled as feedstock into the pre-washing device of the reaction and separation system;
   a by-product preparation device, wherein the filtrate from the multistage separators containing target elements of calcium and magnesium is continuously transferred into the by-product preparation device to form calcium and magnesium based products; and
   a water recirculating device, wherein a remaining liquor is recirculated back to the reaction and separation system after a by-product is collected.

2. The $CO_2$ based hydrometallurgical multistage reaction and separation system according to claim 1, wherein
   the multistage separators further comprise a purifier;
   the filtrate from the multistage separators further comprises impurities and the filtrate is continuously transferred into the purifier after processing through the multistage separators, wherein the impurities comprises iron, silicon, or aluminum; and
   a precipitation is performed to remove the impurities from the filtrate by physically and/or chemically changing a pH value of the filtrate.

3. The $CO_2$ based hydrometallurgical multistage reaction and separation system according to claim 1, wherein the pre-washing device comprises the feedstock and the auxiliary reagents, wherein the feedstock and the auxiliary reagents are mixed produce the washed slurry, and wherein the feedstock is less than 10% by weight of the washed slurry, and the auxiliary reagents are less than 5% by weight of the washed slurry.

4. The $CO_2$ based hydrometallurgical multistage reaction and separation system according to claim 1, wherein the reactor comprises $CO_2$ at a pressure less than 100 bars and the washed slurry at a reaction temperature is controlled under 90° C.

5. The $CO_2$ based hydrometallurgical multistage reaction and separation system according to claim 1, wherein the multistage separators comprise a primary coarse separation module and a secondary fine separation module, a size of particles separated by the primary coarse separator module is larger than 5-10 μm and a size of particles separated by the secondary fine separator module is smaller than 1-5 μm, and a combined reaction time of the primary coarse separation module and the secondary fine separation module is less than 1 hour.

6. The $CO_2$ based hydrometallurgical multistage reaction and separation system according to claim 5, wherein the multistage separators comprise either a combination of a sedimentation centrifuge and a disk-stack centrifuge, a combination of two filter presses, or a combination of a sedimentation centrifuge and a filter press.

7. The $CO_2$ based hydrometallurgical multistage reaction and separation system according to claim 1, wherein the pre-washing device or the reactor comprises the unreacted solids, wherein the unreacted solids are recycled as feedstock into the pre-washing device from the reactor, and a frequency of recycling the unreacted solids is less than 5.

8. The $CO_2$ based hydrometallurgical multistage reaction and separation system according to claim 2, wherein the purifier comprises the filtrate and impurities precipitated from the filtrate, wherein the purifier further comprises an alkaline reagent, acid reagent, coagulant, flocculant, air, or steam to precipitate the impurities from the filtrate.

9. The $CO_2$ based hydrometallurgical multistage reaction and separation system according to claim 1, wherein the multistage separators further comprise a third stage solid-liquid separation module arranged after a purifier, and the third stage solid-liquid separation module is able to continuously separate precipitated particles from the filtrate containing target elements of calcium and magnesium by using a disk-stack centrifuge, a filter press or a filtration.

10. The $CO_2$ based hydrometallurgical multistage reaction and separation system according to claim 9, wherein the third stage solid-liquid separation module comprises the filtrate and iron to produce ferric and/or ferrous hydroxide precipitates for recycling and reusing.

11. The $CO_2$ based hydrometallurgical multistage reaction and separation system according to claim 1, wherein the by-product preparation device comprises the filtrate, calcium, magnesium, or a product comprising calcium or magnesium, wherein the product comprises a calcium magnesium carbonate, a calcium carbonate, a magnesium carbonate, a calcium hydroxide, a magnesium hydroxide, a calcium sulfate, a magnesium sulfate, a calcium nitrate, or a magnesium nitrate.

12. The $CO_2$ based hydrometallurgical multistage reaction and separation system according to claim 1, wherein the water recirculating device or the pre-washing device comprises the remaining liquor, wherein the remaining liquid is recirculated from the water recirculating device to the pre-washing device after the by-product is collected and a recycling frequency of water is larger than 2.

13. The $CO_2$ based hydrometallurgical multistage reaction and separation system according to claim 1, wherein the pre-washing device comprises the industrial solid waste, wherein the industrial solid waste comprises steel slag, iron slag, fly ash, bottom ash, red mud, waste concrete, waste cement, or tailings.

14. The $CO_2$ based hydrometallurgical multistage reaction and separation system according to claim 1, wherein the pre-washing device comprises the mineral and mine tailings, wherein the mineral and mine tailings comprise minerals, the minerals comprising calcium and magnesium.

15. The $CO_2$ based hydrometallurgical multistage reaction and separation system according to claim 1, wherein the pre-washing device comprises the auxiliary reagents, where the auxiliary reagents comprise at least one of acids, salts or a combination of salts and acids containing organic anions, and the acids and organic anions are from the group consisting of oxalate, citrate, picolinate, gluconate, glutamate, formic acid, acetic acid, propionate, valerate, lactate, succinate, phosphate, pyrophosphate, ascorbic acid, and phthalic acid.

16. The $CO_2$ based hydrometallurgical multistage reaction and separation system according to claim 1, wherein the reactor comprises the $CO_2$ that is from a flue gas generated by power plants, blast furnaces, basic oxygen furnaces/converters, refining furnaces, lime kilns, coal-to-chemicals manufacturing plants or petrochemical manufacturing plants, and a content of the $CO_2$ in the flue gas varies between 15% and 98%.

17. The $CO_2$ based hydrometallurgical multistage reaction and separation system according to claim 2, wherein the multistage separators comprise a primary coarse separation module and a secondary fine separation module, a size of particles separated by the primary coarse separator module is larger than 5-10 µm and a size of particles separated by the secondary fine separator module is smaller than 1-5 µm, and a combined reaction time of the primary coarse separation module and the secondary fine separation module is less than 1 hour.

18. The $CO_2$ based hydrometallurgical multistage reaction and separation system according to claim 3, wherein the multistage separators comprise a primary coarse separation module and a secondary fine separation module, a size of particles separated by the primary coarse separator module is larger than 5-10 µm and a size of particles separated by the secondary fine separator module is smaller than 1-5 µm, and a combined reaction time of the primary coarse separation module and the secondary fine separation module is less than 1 hour.

19. The $CO_2$ based hydrometallurgical multistage reaction and separation system according to claim 4, wherein the multistage separators comprise a primary coarse separation module and a secondary fine separation module, a size of particles separated by the primary coarse separator module is larger than 5-10 µm and a size of particles separated by the secondary fine separator module is smaller than 1-5 µm, and a combined reaction time of the primary coarse separation module and the secondary fine separation module is less than 1 hour.

20. The $CO_2$ based hydrometallurgical multistage reaction and separation system according to claim 2, wherein the pre-washing device or the reactor comprises the unreacted solids, wherein the unreacted solids are recycled as feedstock into the pre-washing device from the reactor, and a frequency of recycling the unreacted solids is less than 5.

* * * * *